United States Patent [19]
Petrovich

[11] Patent Number: 5,915,650
[45] Date of Patent: Jun. 29, 1999

[54] AIRCRAFT WING WITH DUAL AXIS MOBILITY

[76] Inventor: Enrique G. Petrovich, 2730 NE. 23rd St., Pompano Beach, Fla. 33062

[21] Appl. No.: 08/891,302

[22] Filed: Jul. 10, 1997

[51] Int. Cl.6 .................................................. B64C 3/38
[52] U.S. Cl. ............................ 244/46; 244/901; 244/63; 244/38
[58] Field of Search ................................. 244/38, 16, 901, 244/904, 46, 47, 87, 90 R, 63, 106, 153 R, 154

[56] References Cited

U.S. PATENT DOCUMENTS

| | | | |
|---|---|---|---|
| 1,751,622 | 3/1930 | Davis | 244/47 |
| 2,074,897 | 3/1937 | Everts | 244/46 |
| 2,573,271 | 10/1951 | Perl | 244/2 |
| 2,683,574 | 7/1954 | Peterson | 244/46 |
| 3,138,352 | 6/1964 | Saholt | 244/63 |
| 4,027,835 | 6/1977 | Sachs | 244/2 |
| 4,050,654 | 9/1977 | Heckman | 244/901 |
| 4,053,122 | 10/1977 | Gar | 244/11 |
| 4,068,607 | 1/1978 | Harmon | 244/900 |
| 4,158,448 | 6/1979 | Mochizuki | 244/13 |
| 4,262,863 | 4/1981 | Slusarczyk | 244/13 |
| 4,375,280 | 3/1983 | Nicolaides | 244/13 |
| 4,417,707 | 11/1983 | Leong | 244/64 |
| 4,568,043 | 2/1986 | Schmittle | 244/48 |
| 4,596,368 | 6/1986 | Schmittle | 244/48 |
| 4,607,811 | 8/1986 | Rousseau | 244/13 |
| 4,773,619 | 9/1988 | Rubik | 244/46 |
| 4,824,047 | 4/1989 | Chadwick | 244/2 |
| 4,901,945 | 2/1990 | Hodgson | 244/2 |
| 5,044,576 | 9/1991 | Inada | 244/13 |
| 5,054,721 | 10/1991 | Brenholt | 244/903 |
| 5,170,965 | 12/1992 | Yasuda | 244/64 |
| 5,181,674 | 1/1993 | Apgar | 244/47 |
| 5,620,153 | 4/1997 | Ginsberg | 244/13 |

FOREIGN PATENT DOCUMENTS

| | | | |
|---|---|---|---|
| 579616 | 10/1924 | France | 244/46 |
| 982898 | 2/1965 | United Kingdom | 244/46 |

OTHER PUBLICATIONS

Popular Mechanics,, Corsair Starters Power Homebuilts May 1997 Issue.

*Primary Examiner*—Galen L. Barefoot
*Attorney, Agent, or Firm*—John C. Smith

[57] ABSTRACT

A wing structure for hang gliders, ultralites, gliders, heavy aircraft, ornithopters and sailsoaring flying boats which has a first wing set that pivots on two axis, and a second wing set that remains substantially immobile relative to the fuselage or keel. The wing pivots on the lateral axis of the fuselage or keel by moving along a slider assembly that allows it to move from a swept position to a more perpendicular position relative to the keel to control the amount of lift. The wing also pivots on the longitudinal axis of the fuselage or keel to control banking. On hang glider versions of the device, optional ducted fan, propeller, or jet propulsion units provide power to maintain flight. An optional bungee launch assembly assists takeoff from relatively flat surfaces. An optional "telepresence" wing controller allows the pilot to control wing motion with minimal physical exertion. Optional landing gear are controlled by wing position, such that the landing gear are lowered when the wings are in the forward takeoff/landing position and raised when the wings are in the swept flight position.

25 Claims, 16 Drawing Sheets

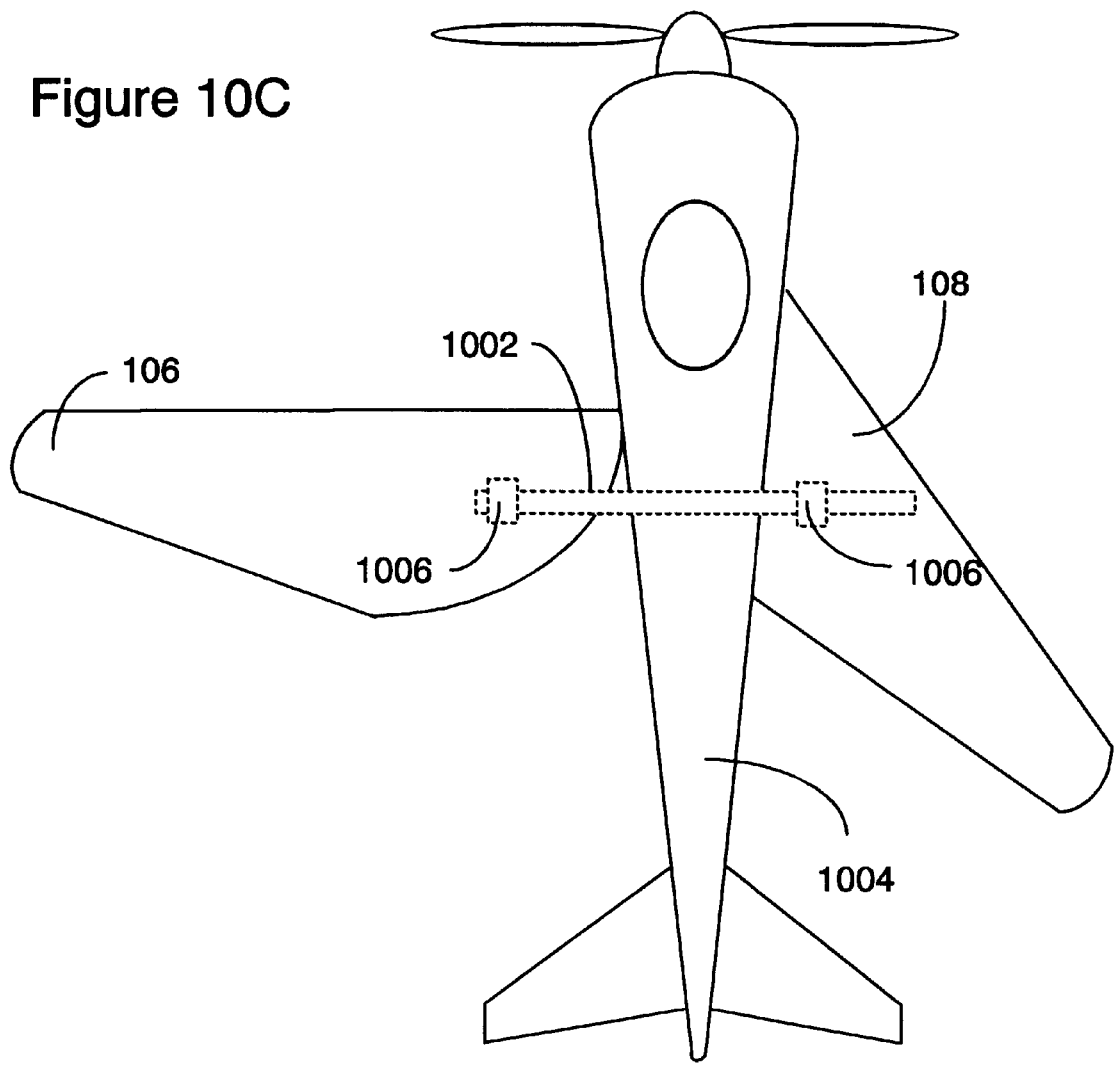

AIRCRAFT WING WITH DUAL AXIS MOBILITY

BACKGROUND OF THE INVENTION

1. Technical Field

The present invention relates to aircraft. In particular, it relates to aircraft with wings capable of simultaneous movement along two axis, including a sliding motion on a first axis and a rotating motion on a second axis.

2. Background Art

A variety of aircraft types are currently in wide use. For example, heavy fixed wing aircraft, ultralite aircraft, and hang gliders. While substantially different in many respects, each of these aircraft types share wing structures which are fixed or able to move about one axis only.

The development of hang gliders has provided flyers with a relatively inexpensive and easy method of flying. Hang gliders currently in general use are based on the standard Rogallo type glider. Rogallo type hang gliders are typically constructed with leading edges arranged to intersect a keel at a forward point. The leading edges are connected by a cross bar and a control bar is suspended from the cross bar. A sailcloth is stretched over the leading edges and battens to form a fixed type wing. Flight is accomplished by catching an updraft and are controlled by shifting the pilot's body weight on the control bar. Some hang gliders have been developed which are designed to allow the pilot to flap the wings about a single fixed vertical axis to assist lift. These structures all result in a limited amount of control over wing motion which in turn reduces safety and performance.

While hang gliders typically have flexible wings, heavy aircraft have rigid wings which usually are made from metal. While most heavy aircraft have fixed wings, there are some high performance military aircraft as well as supersonic commercial transport aircraft which allow the wings to pivot about a single fixed horizontal axis. The wing movement is designed to increase lift during takeoff by extending the wings to a position which is relatively perpendicular to the fuselage, and to decrease drag and increase performance by sweeping the wings back during high speed flight.

Utralites exhibit characteristics of the hang glider and heavy aircraft. The wing structures in this type of aircraft are typically fixed and share the same safety and performance drawbacks exhibited by hang gliders and heavy aircraft. It would be desirable to have a wing structure for any of the foregoing aircraft types which would provide greater control, safety and performance characteristics.

Another problem associated with hang gliders is the difficulty associated with becoming airborne. While hang gliders with a variety of wing shapes have been developed, each of them has a wing fixed to a keel. With such hang gliders, the pilot is required to make an approach run so as to catch an updraft or to leap down from a high place. Therefore, it is necessary to find a location with a difference in altitude between the taking off point and the landing point, and even if the take off by way of an approach run is successful, it is difficult to soar continuously for many hours unless an updraft is caught properly by the wing. In flat areas, the only way to launch a hang glider is through outside assistance, such as being towed aloft by a powered aircraft in the same manner as a conventional glider. Power assisted takeoff is usable from the origin point of the flight. However, once the hang glider has landed away from the airfield which provided the towing, power assisted takeoff for return trips would not be available. As a result, hang gliders require locations with physical areas that are suitable for relaunching in order to return. In flat areas, this may not be possible. Therefore, it would be desirable to have an easy method of relaunching a hang glider from a flat surface.

Hang gliders have been developed with wheeled frames which form an enclosure for supporting a person suspended from the neutral point of the wing. The pilot is seated in the enclosure which may have an internal combustion engine fixed behind the user. The powered hang gliders of this type provide extended flying time, but there are also several drawbacks associated with this type of aircraft. One disadvantage is that the motorized enclosure is heavy, bulky, and difficult to transport. This detracts from the ease of transport associated with conventional hang gliders. The weight of the enclosure is also a serious functional drawback since it requires the motor to operate continuously to keep flying. If the motor stops, the sink rate is high. In addition, such enclosures are usually bare frames without any kind of streamlining. Therefore, another functional drawback is the high aerodynamic drag associated with this design. Attempts to overcome these disadvantages, such as increasing the wing area and/or the motor power of the aircraft have been made. However, as the wing span increases and/or the power increases, the motorized hang glider ceases to be a very light and maneuverable aircraft suitable for gliding sport and tends to become more like an ultralite. It would be desirable to provide an enclosure which did not have the increased drag of prior art devices.

Other means have also been devised to motorize a hang glider without resorting to a wheeled enclosure. For example the motor and prop may be fixed under the keel of the wing in one of two positions relative to the center of gravity: a first position in which the motor is behind the center of gravity with the propeller in front, which is referred to as a puller system; and a second position in which the motor is in front of the center or gravity with the propeller behind, which is referred to as a pusher system. These solutions improve upon the weight and drag penalties created by the hanging enclosure. In particular, the pilot can be in a prone position hanging from the wing by means of a harness which results in reduced drag.

Unfortunately, mounting the power unit on the keel of the wing gives rise to piloting difficulties which may be dangerous since by definition a hang glider is controlled in flight by the pilot's movements relative to the wing's center of lift. The weight of the fixed motor reduces the effect of the pilot's movements and therefore reduces the pilot's control of the aircraft in flight. It would be desirable to have the advantage of powered flight without the disadvantages associated with the additional weight that causes loss of control.

A third system consists in strapping the motor to the pilot's back. The combined pilot and motor weight increases the effects of pilot body movement on aircraft control, but substantially adds to the danger in the event of a crash. Also, the drag is substantially increased because the pilot must remain in an upright position during flight. Another difficulty stems from the fact that take off is possible only from a suitable slope. Further, motorized take off is also physically difficult, except in the case of the wheeled enclosure, but in that case the drag and the weight of the enclosure reduces the performance of the motorized hang glider once airborne.

The ultralite and heavy aircraft exhibit similar drawbacks. In particular, the maximum performance characteristics cannot be achieved because the wings are either fixed or restricted in motion.

Another disadvantage of prior art hang gliders is the need to manually control the wings. This results in pilot fatigue and reduces the amount of time which the pilot can comfortably fly. It would be desirable to control the hang glider wing with a power assist that would not tire the pilot.

The prior art has failed to provide a method of controlling wing position to increase safety be increasing pilot control and to maximize takeoff and flight performance which allows the wing to move on more than one axis. The prior art has failed to provide an easy method of taking off hang gliders from flat surfaces. Further, the prior art has not provided a convenient method of assisting takeoff from flat surfaces which does not involve powered units.

SUMMARY OF THE INVENTION

The present invention solves the foregoing problems by providing a wing structure for hang gliders, ultralites and heavy aircraft which has two wing sets. A first wing set that pivots on two axis with sliding motion on one axis of the first wing set, and a second wing set that remains substantially immobile relative to the fuselage or keel. The wing pivots on the lateral axis of the fuselage or keel by moving along a slider assembly that allows it to move from a swept position to a more perpendicular position relative to the keel to control the amount of lift. The wing also pivots on the longitudinal axis of the wing spar (wing support bar). A first embodiment rotates both wings in unison, and a second embodiment allows each wing to rotate independently to provides more control of aircraft maneuvering. The second wing set may be located at the rear of the aircraft in a conventional "tail" assembly, or it may be located at the forward end of the aircraft. On hang glider versions of the device, optional ducted fan, propeller, or jet propulsion units provide power to maintain flight. The power propulsion units may be located forward, aft, or mid-fuselage depending on aircraft design and weight distribution considerations. An optional bungee launch assembly assists takeoff from relatively flat surfaces. An optional "telepresence" wing controller allows the pilot to control wing motion with minimal physical exertion. Optional landing gear are controlled by wing position, such that the landing gear are lowered when the wings are in the forward flared (i.e. takeofff/landing) position and raised when the wings are in the swept flight position.

BRIEF DESCRIPTION OF THE DRAWINGS

FIG. 10C is a top view showing a preferred embodiment of a conventional heavy movable wing aircraft with one wing in the swept configuration and the other wing in a flared configuration.

DESCRIPTION OF THE PREFERRED EMBODIMENT

Figure 1:
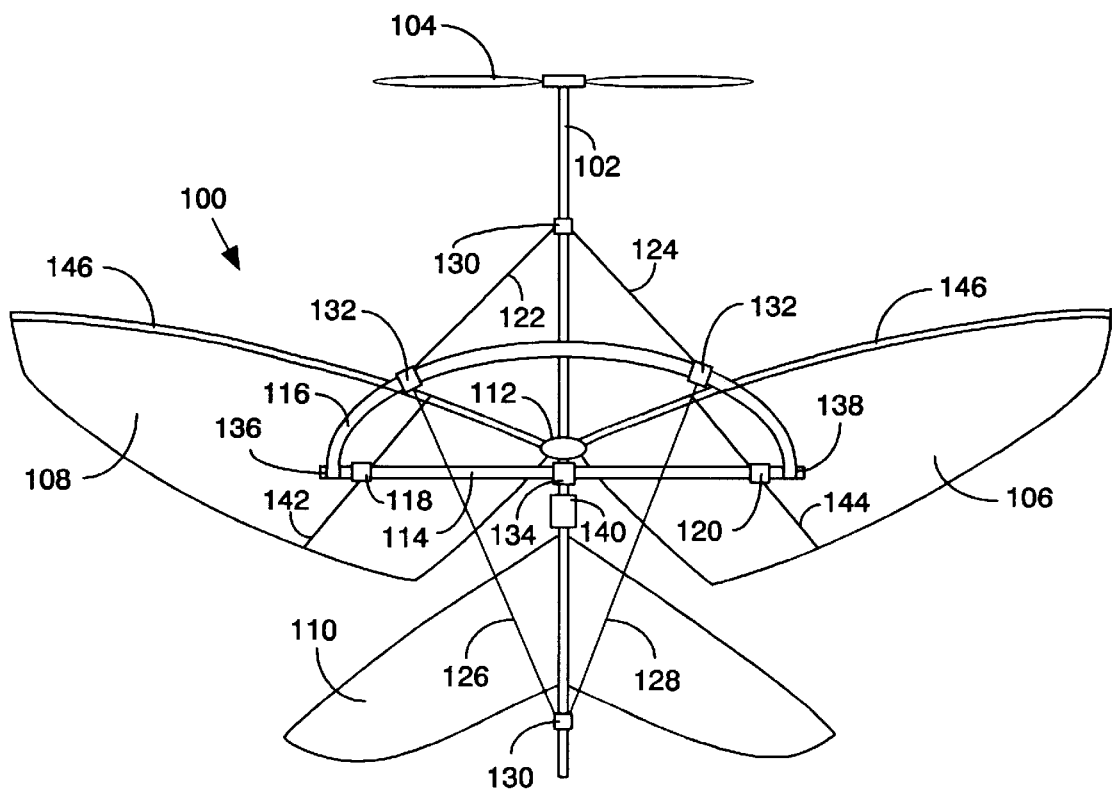
FIG. 1 is a bottom view showing a preferred embodiment of a dual axis hang glider in the flared configuration.

Prior to a discussion of the figures, a general overview of the dual sliding axis wing system will be presented. For the purposes of this discussion, hang gliders, ultralites, and heavy aircraft will be used interchangeably to teach the features and advantages of the invention. However, those skilled in the art will recognize that the advantages of the dual sliding axis structure can be applied to any winged aircraft, including hang gliders, ultralites, gliders, heavy aircraft, or even future ornithopters and sailsoaring boats.

The dual sliding axis aircraft is an aircraft unlike any other, featuring shifting wings, tail and landing gear. The ultralite version has hang glider origins. However, ultralites have evolved into conventional small airplanes with some advantages of small airplanes like fuel economy, but with more of their problems. Wind variations greatly limit their flight envelope and call for more powerful engines for takeoff and wind penetration. Safety problems like accidental stalls and design restrictions limit their potential as energy saving transportation. Small airplanes in more crowded skies require more pilot training and regulations to prevent accidents. Ultralite construction has become a strict compromise between more powerful engines with greater fuel requirements and more complex yet light enough airframes to comply with FARs. And they operate best from airfields that are energy intensive to build. The dual axis wing corrects these problems and offers substantial energy savings in personal transportation.

Simple lateral weight/tail shift roll control and sliding bi-axial wing sweep pitch control gives the dual sliding axis aircraft a wider flight envelope than conventional aircraft. The absence of braces, rudder, flaps, ailerons, stabilizers or other mechanical flying surfaces greatly simplifies, lightens, streamlines and strengthens it, giving it approximately double the VNE (never exceed speed) of other ultralites. The ability to move the wing on two axis makes the aircraft more maneuverable and aerobatic. Therefore, it will recover much more quickly from stalls and spins than conventional aircraft. It is instinctive and easier to fly, easier to build and maintain, and more compact and easier to transport and set up than other ultralites. The great strength of the dual sliding axis aircraft will allow it to penetrate strong headwinds, dive at over 100 mph and quickly flare, brake and hover to a safe pin point, no roll, off-field landing. An onboard catapult permits 0'–10' off-field takeoffs. The dual sliding axis aircraft system can be used to improve the performance of any size fixed wing aircraft.

The hang glider version of the dual axis aircraft will require no costly prepared airfields to operate from. An optional bungee launch assembly on the hang glider version assists takeoff from flat surfaces. Because of its onboard catapult assist feature, it needs no large engine for takeoff power. It can use small gas, hybrid, or electric propeller or ducted fan engines, which when coupled with photovoltaic cells on the wings and tail will give this ultralite extended range with minute energy expenditure. For some applications, it can use a small commercially available jet engines such as the 90 hp, 84 lb Garrett minijet starter motor.

A principal advantage of the device is that the wings can also be hinged and moved up and down in a birdlike fashion combined with the ability to sweep them longitudinally (i.e pivot along a longitudinal plane). Wings that can sweep longitudinally give birds, insects and bats a greater flight envelope and much greater maneuverability than aircraft with fixed wings. Sweeping wings could have great advantages even on large aircraft. But until now such wings have not been very effective or practical. So for control input, aircraft must rely on articulated surfaces on the wings like ailerons, flaps and other ever more complex systems, and fly within the tight envelope allowed by those systems.

The dual axis aircraft system solves the problem of moving positionable wings on aircraft in a simple manner. In so doing, dual axis aircraft provide several benefits. The hang glider/ultralite versions allow personal air transportation. It is capable of flight in most weather conditions, with great maneuverability, speed, range, with little fuel requirements, with maximum safety, and without the need for airfields or airstrips to operate from. Though dual axis aircraft systems can be used in aircraft of any size to increase their efficiency and capabilities, the ultralite version may be the preferred one for personal flight due to it's low cost, simple design, great maneuverability, strength and provision of environmental protection if the pilot is in an enclosed cockpit.

What makes the dual axis aircraft system unique is that it allows aircraft of any size, to sweep soft or rigid wings fore and aft, together or individually, in a wide arc. This provides for pitch and roll control, for instant stall recovery and for speed, best glide, or flare, for pin-point, off-field birdlike landings. And it does so with a very simple, strong, lightweight, and aerodynamic system based on a single or divided main spar and wings that slide across and rotate along the spar and keel/fuselage with structural support in all directions.

Flight controls in the preferred embodiment of the hang glider and ultralite versions unction by means of cables, pulleys and control bar. In these versions the pilot and tail swivel united on the keel to shift laterally for roll control. Alternative embodiments employ slightly more advanced versions using joysticks and actuators for lateral weight shift roll control and for moving the keel slider in pitch control. Further, advanced control devices, such as telepresence devices can be used to control the aircraft with a minimum amount of physical effort. These devices use data gloves with sensors. The sensor information is used to move the wings instinctively, based on the sensed movement of the pilot's hands. This greatly reduces pilot fatigue since the pilot does not have the burden of constantly holding and moving potentially heavy flight controls. The dual axis aircraft system also gives a wider flight envelope to large aircraft because each wing can be swept individually to enhance maneuverability. The split tail is used as elevator and ailerons combined (elevons).

An optional bungee catapult may be used for jump takeoffs. A short bungee is tensioned and released by the pilot. This bungee assist not only allows for short field or no field jump takeoffs, but also for the use of a small fuel efficient engine. The bungee assist provides a significant advantage over conventional ultralites which require large engines to overcome takeoff drag, but once in the air, only serve to reduce effective payload.

Once catapulted into the air and the bungee is reeled in, the dual axis aircraft continues to fly on engine power. It's wings are swept to the center, with the center of effort just behind the center of gravity, to best glide position, analogous to fixed wing aircraft. To climb, the wings are moved slightly forward so the center of effort is brought even with or slightly forward of the center of gravity.

A principal advantage of the dual axis system is that the greater control and positioning capability of the wings in the dual axis aircraft allows it to perform maneuvers which prior art aircraft cannot do. For example, it can dive from altitude at speeds never reached by other ultralites. By sweeping back it's wings, the center of effort moves further behind the center of gravity for a high speed dive or strong wind penetration. Solar cells on the top of the wings and tail can charge batteries while soaring. At the bottom of the dive, the dual axis aircraft can immediately flare to a hover without structural damage, and pin-point land with no roll.

An alternative embodiment of the dual axis aircraft uses a ducted fan for propulsion. The pilot and engine are positioned so that the center of gravity of the dual axis aircraft is slightly forward of the center of effort when the wings are moved to the mid position for best glide, as in fixed wing aircraft. By moving the wing slider forward on the keel, the wings sweep back, moving the C.E. incrementally further behind the c.g. for wind penetration and dive. By moving the wing slider back on the keel, the wings sweep forward incrementally to go up and to flare for landings. The individual wings can be moved independently. This provides a significant advantage because the wings can be swept individually to bank and turn. This results in a much higher performance aircraft than prior art aircraft which move wings in tandem. This provides greater safety to individual pilots due to the greater control independent wing movement provides.

An important feature of the dual axis aircraft system is the simple double sliding axes of wing rotation, that gives main spar support to the wings throughout their wide arc. Positionable wing aircraft like the F-14 Tomcat have had one fixed axis of rotation per wing, which limits range of motion by raising problems of wing support and complexity. The dual axis aircraft system provides great advantages over prior art fixed wing and single axis aircraft due to the substantial performance and maneuvering capability it possesses.

Table 1, below, is a comparison of a prior art ultralite and a dual axis aircraft ultralite. The values for dual axis aircraft are approximate, based model tests. The table illustrates some of its advantages over the prior art:

TABLE 1

| AVERAGE ULTRALITE | DUAL AXIS ULTRALITE |
|---|---|
| Aluminum and Dacron structure | Aluminum, Dacron and Carbon Fiber (C.F.) |
| 100% strut-braced Wings: fixed | No struts |
| Al. leading edge is main spar | C.F. leading edge and C.F. main spar |
| Al. trailing edge is rear spar | C.F. tail leading edge and C.F. tail spar |
| Flaps, Ailerons and Rudder | No flaps, no Ailerons, no Rudder |
| Al. ribs | C.F. ribs |
| Tail: fixed w/ elevator and rudder | Tail: rotates, no elevator, no rudder |
| Dimensions: | Dimensions: |
| Length: approx. 21 feet | Length: approx. 18 feet |
| Wing Span: approx. 29 feet | Wing Span: approx. 31 feet |
| Height: approx. 7 feet | Height: approx. 6'6" |
| Weight: | Weight: |
| Empty: approx. 254 lb. | Empty: approx. 260 lb. |
| Gross: approx. 530 lb. | Gross: approx. 530 lb. |
| Useful load: 279 lb. | Useful load: approx. 330 lb. |
| Power: | Power: |
| Engine: Rotax 28–65 hp w/68" propeller | Rotax 28 prop, gas/electric ducted fan, jet |
| Range: 100 miles | Range: w/electric, >100 miles |
| Never Exceed Speed (VNE): 85 mph | Never Exceed Speed (VNE): 200 mph |
| Cruise Speed: 55–75 mph | Cruise Speed: 0–150 mph |
| Stall Speed with full flaps: 26 mph | Stall Speed: Parachutes at near 0 mph |
| Takeoff Roll: 100–150' at Gross Weight | Takeoff Roll: Jump takeoff from 0–10' |
| Landing Roll: 95–150' with full flaps | Landing Roll: 0–10' |

Another principal advantage of the invention is the reduced energy costs required to operate the dual axis aircraft. A personal dual axis ultralite aircraft equipped with a gas engine will burn approximately 2 gallons of fuel or less an hour for a range of over 200 miles. One equipped with an electric motor, batteries and solar cells, flying in the daytime, and using the engine intermittently as a thermal to thermal assist, could theoretically have a greatly extended range with little energy consumption per mile. Those skilled in the art will recognize that the energy savings in the latter version would depend on factors such as weight of batteries, powerplants, photovoltiacs and their efficiencies.

The components required to build a powered version of the dual axis aircraft with a Rotax 447 engine and gear drive are as follows:
  with full fuselage enclosure,
  carbon fiber wings and spars with copper lightning proof mesh, wing slider,
  boom sliders,
  rotary pitch actuator,
  linear roll actuator,
  3.8 oz. Stabilized Dacron colored sail cloth, heavy duty wings,
  heavy duty fiber glass landing gear legs,
  tail dragger with steerable tail wheel or tricycle/steerable nosewheel,
  rough terrain wheels—16"×6.5"×615,
  Rotax 447 engine with gear drive,
  two-bladed wooden prop,
  5 gallon fuel tank,
  anodized keel Referring to FIG. 1, this figure shows a bottom view of a preferred embodiment of a hang glider 100 with the dual axis wings 106, 108 in the flared (for landing) position. For ease of illustration, the pilot and some components, such as the propeller drive unit, the landing gear, and the pilot harness (or enclosure) are not shown in FIGS. 1 and 2 to facilitate discussion of the wing 106, 108 positioning.

The hang glider 100 has forward dual axis wings 106, 108 which are secured to slider 112. Slider 112 moves longitudinally along keel 102 and is also capable of rotating wings 106, 108 laterally on keel 102. In this embodiment, dual axis wings 106, 108 are synchronized by support bar 114 which is secured to keel 102 and attached to dual axis wings 106, 108 by boom sleeves 118, 120. Control bar 116 is secured to keel 102 by clamp 134. In operation, a pilot would be suspended below support bar 114 and above control bar 116. In this configuration, control bar 116 is moved toward the proximal end of keel 102 which causes support bar 114 to move dual axis wings 106, 108 to the standard takeoff or flare for landing position by moving slider 112 toward the distal end of keel 102.

Propeller assembly 104 is attached to the proximal end of keel 102 and is driven by an internal shaft (not shown). A tail assembly 110 is attached to the distal end of keel 102, and in the preferred embodiment, is not laterally movable, but may optionally rotate on keel 102 in conjunction with shifting pilot weight shift roll control. For ease of illustration, propeller assembly 104 is shown at the proximal end of keel 102 and tail assembly 110 is shown at the distal end of keel 102. However, those skilled in the art will recognize that the locations of the propeller assembly 104 and the tail assembly 110 can be reversed for a particular design.

In practice, the propeller assembly 104 will be driven by a propulsion unit 140 which may be implemented by a number of known techniques. For example, either a conventional internal combustion or electric battery operated motor may be used. In the case of the electric motor, the battery can be supplemented with solar cells or the like.

Guide wires 122, 124, 126, 128 run through pulleys (not shown) are secured to clamps 130, 132 such that clamps 130 remain stationary in regard to keel 102. Thus, they define a pivot point for control bar 116. When a pilot grasps control bar 116 between clamps 132 and pushes control bar 116 toward the distal end of keel 102, boom sleeves 118, 120 fixed to and rotating on booms 142, 144 slide on support bar 114 toward the proximal end of keel 102. This causes booms 142, 144 to move inward toward the keel 102 thereby placing wings 106, 108 in an increasingly swept wing position. At the same time, the pilot can move slider 112 on keel 102 by rotating control bar 116. This will cause wings 106, 108 to rotate around sliders 112, 118, 120. As a result, the wings simultaneously slide longitudinally along keel 102 as they pivot about slider 112 from a flared to a swept position.

The movable control bar 116 and the fixed support bar 114 are connected by swivels 136, 138 at the ends. Those skilled in the art will recognize that a variety of changes can be made. For example, the control bar 116 can be eliminated if boom sleeves 118, 120 are positioned by powered actuators. In addition, if the slider 112 is split into two separate sliders, one for each wing, and the support bar 114 and control bar 116 are also split such that each wing 106, 108 has separate support and control bars, then the wings 106, 108 can be independently controlled. By splitting the control bar 116, it would form two control arms, one attached to a respective dual axis wing 106, 108. By splitting the support bar, each half can be hinged to the keel 102 and power actuated for flapping the wings 106, 108.

Figure 2:
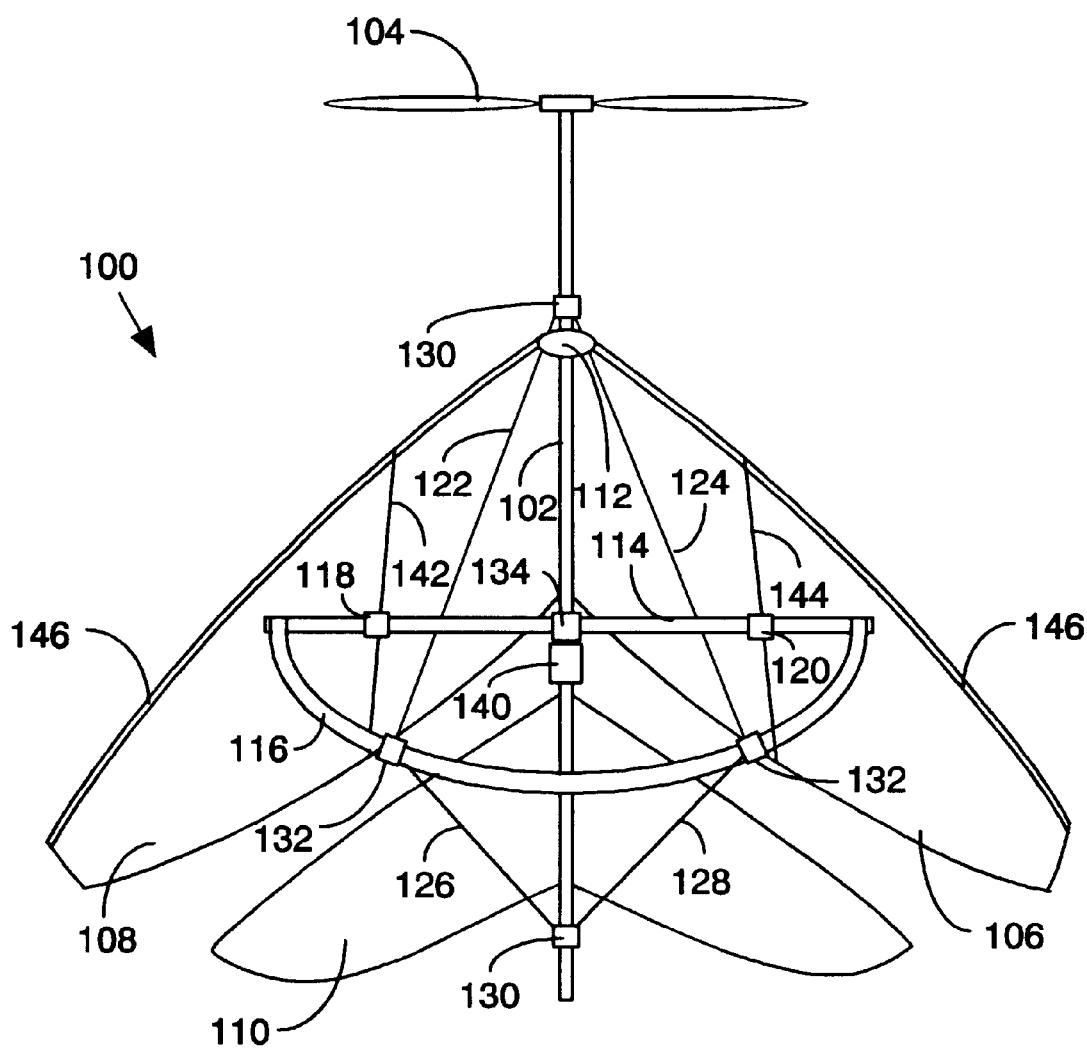
FIG. 2 is a bottom view showing the embodiment of FIG. 1 in the swept configuration.

FIG. 2 is a bottom view of the embodiment of FIG. 1 which illustrates the hang glider 100 in the swept wing configuration. This position is achieved by moving the control bar 116 toward the distal end of keel 102 which moves the sleeve 112 toward the proximal end of keel 102 which in turn moves boom sleeves 118, 120 along support bar 114. By sliding boom sleeves 118, 120 along support bar 114, the dual axis wings 106, 108 are pivoted toward the keel 102. At the same time the sleeve 112 is moved longitudinally along keel 102. As a result, the actuation of control bar 116 results in the simultaneous pivoting of dual axis wings 106, 108 and the movement of dual axis wings 106, 108 in relation to keel 102.

While FIGS. 1 and 2 illustrate the flared and swept positions, respectively, those skilled in the art will recognize that the dual axis wings 106, 108 can be move to any position between those illustrated. In practice, the flared position provides the best lift for standard takeoff and landings, the swept position provides the minimum drag for dives and jump (or bungee assisted) takeoffs, and an intermediate position, slightly less than fully swept, would provide the best glide (or continuous flight) performance. Likewise, FIGS. 1 and 2 illustrate a propeller assembly 104 and propulsion unit 140 which is optional. If the propeller assembly 104 and propulsion unit 140 are omitted, the aircraft can be flown as an unpowered craft, similar to a conventional hang glider or sailplane.

Figure 3:
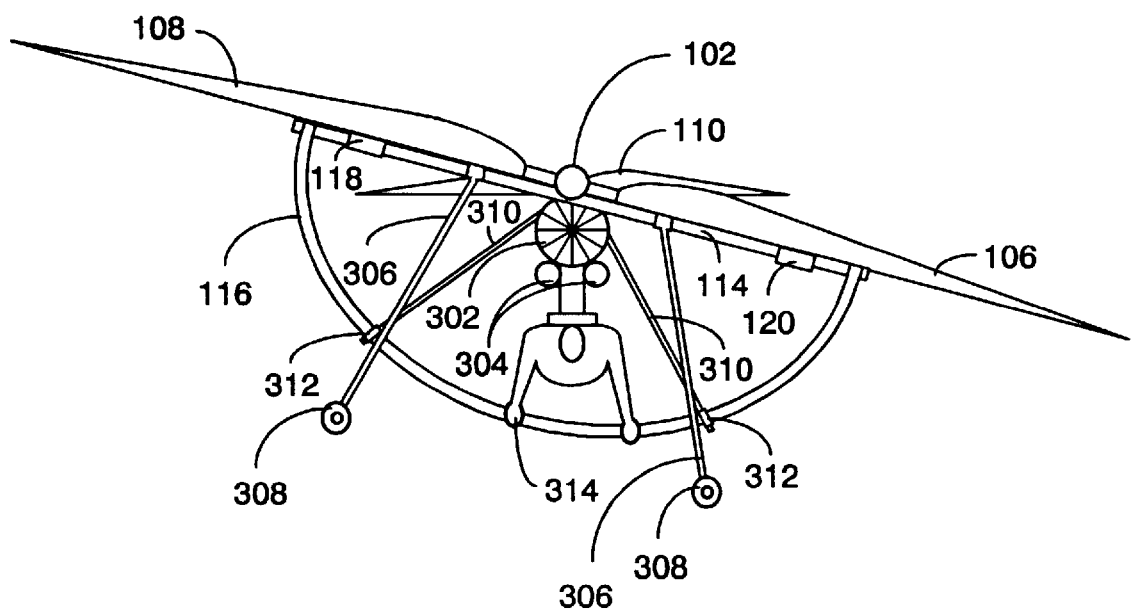
FIG. 3 is a proximal end view showing the embodiment of FIG. 1 with the wing rotated. An optional landing gear assembly is also shown.

FIG. 3 illustrates a proximal end view of an alternative embodiment which differs from the previous embodiment in that the propeller assembly 104 and propulsion unit 140 have been replaced with a ducted fan 302 and power supply 304. Ducted fans are well known in the art. This figure illustrates dual axis wings 106, 108 rotated in a banking position. Tail assembly 110 is shown in alignment with the pilot 314. In the preferred embodiment, the pilot's body remains in substantial alignment with the tail assembly 110. The combination of pilot weight and the tail assembly 110 provides stability and control during banking maneuvers.

Control bar 116 is shown attached at swivel points 136, 138 to support bar 114. In turn, support bar 114 is secured to booms 142, 144 vis boom sleeves 118, 120. When the pilot 314 initiates a banking maneuver, control bar 116 is rotated which rotates the dual axis wings 106, 108 in relation to the tail assembly 110.

Also shown in this figure is a landing gear assembly which is comprised of the wheels 308, support legs 306, rear wheel rods 310 and rod couplers 312. The rear wheel rods 310 are attached to a rear wheel 412 (shown in FIG. 4). In the flare position, the rear wheel 412 is automatically lowered for landing, and in the glide or swept wing position, the rear wheel 412 is automatically retracted to decrease drag.

Figure 4:
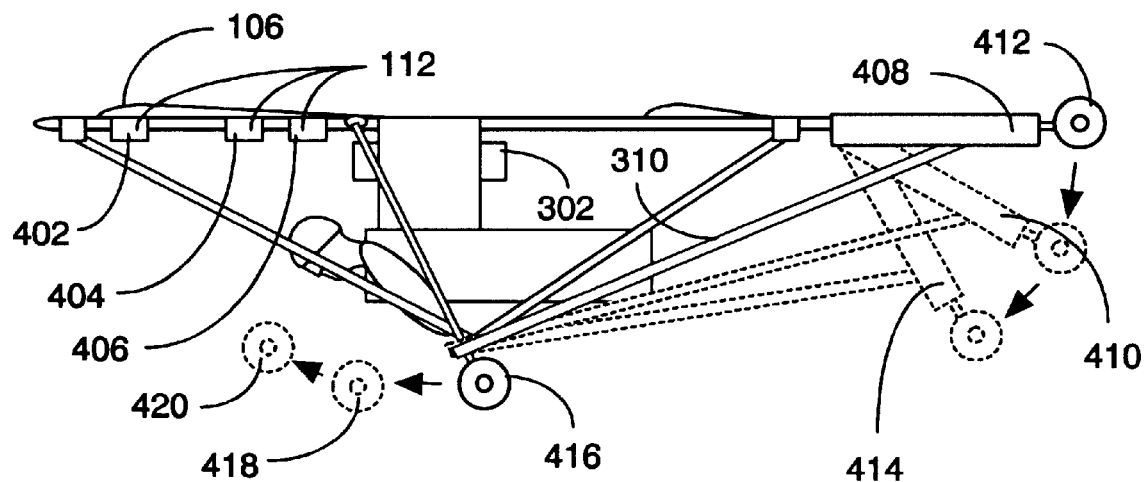
FIG. 4 is a side view of an alternative embodiment showing the position of the slider in the flared, glide and swept positions. This figure also illustrates a retractable gear arrangement and a ducted fan drive.

FIG. 4 is a side view of the embodiment of FIG. 3. This figure uses shadow views to illustrate the various slider and wheel configurations. In the swept wing position, slider 112 is located at position 402, front wheels 308 are located at position 416, and the rear wheel 412 is located at position 408. In the glide position, slider 112 is located at position 404, front wheels 308 are located at position 418, and the rear wheel 412 is located at position 410. Finally, in the flare position, slider 112 is located at position 406, front wheels 308 are located at position 420, and the rear wheel 412 is located at position 414.

Those skilled in the art will recognize that placement of components of the aircraft can vary. For example, the propeller 104 or other propulsion unit can be placed at the distal end of the keel and the tail assembly can be moved to the proximal end of the keel. They could also be placed under the keel 102 or fuselage, on top of, under, in front of or behind the pilot without altering the dual axis operation of the aircraft. As a result, the locations of the components shown in the foregoing figures should be considered exemplary.

Figure 5A:
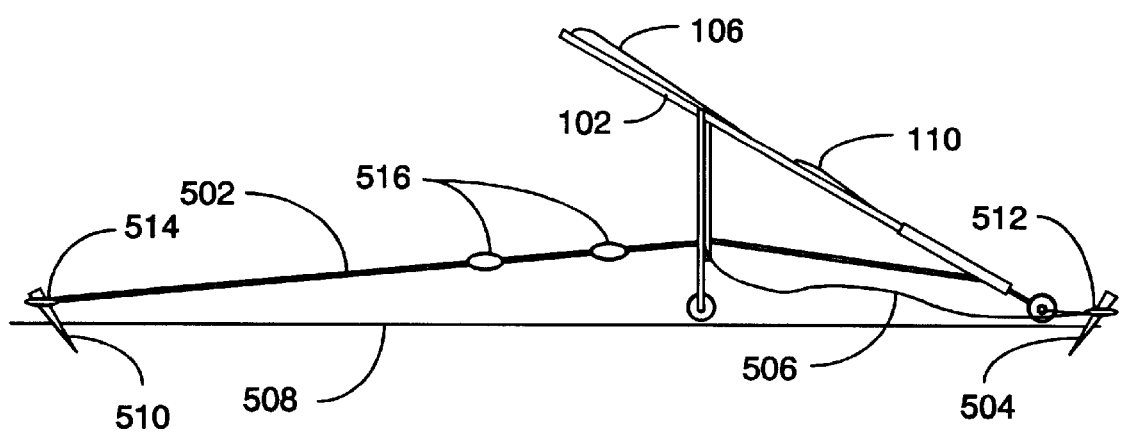
FIG. 5A is a side view illustrating an alternative embodiment with a bungee launch cord. The aircraft is shown in the pre-launch position with the propellers folded and the dual axis wings in the swept position.
Figure 5B:
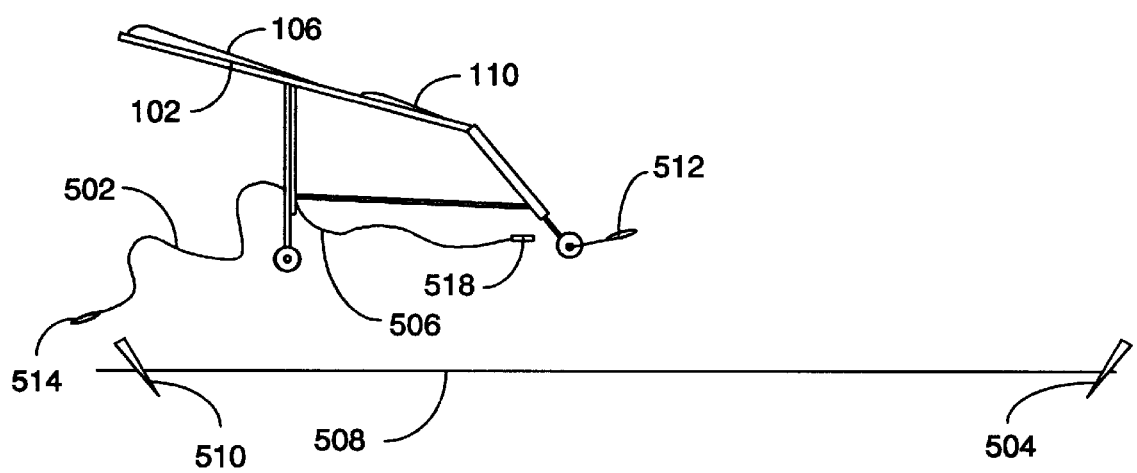
FIG. 5B is a side view illustrating the embodiment of FIG. 5A during launch. The aircraft is shown with the propellers in rotation and the dual axis wings beginning to sweep forward.

FIGS. 5A–5B illustrate another alternative embodiment which uses a bungee cord mechanism to assist in the launch of an aircraft from a flat surface. In FIG. 5A, an aircraft is in the pre-launch configuration. The aircraft rests on surface 508 and is held to retaining pin 504 by a releasable clip 512. Bungee cord 502 is secured to launch pin 510 by slidable ring 514 on one end and by a cord tensioning device 516 on the other end. The tensioning device 516 can be a simple pulley system as shown, a hand operated winch, etc. Likewise, it can be operated manually or powered via a battery powered motor etc. The tension on bungee cord 502 is increased gradually by the tensioning device 516. Once the tension has been increased sufficiently, the aircraft can be assisted in taking off in catapult fashion by the bungee cord 502 when releasable clip 512 is opened.

In the preferred embodiment, prior to releasing the releasable clip 512 the pilot engages the engine (which may be a propeller, ducted fan propulsion unit, jet engine, etc). The aircraft is held immobile by releasable clip 512 and retaining pin 504 during the engine runup. When the engine is at maximum thrust, the pilot opens releasable clip 512 by pulling on release cable 506 which pulls clip pin 518 (shown in FIG. 5B) from releasable clip 512. This frees the aircraft from retaining pin 504 and allows it to move forward. Prior to launch, the wings 106, 108 are in swept configuration. When clip 512 is removed, the wings are moved forward to the flared position to maximize lift. At the same time that the engine is providing forward thrust, the bungee cord 502 is adding to the forward thrust and in effect, becomes a catapult take-off assist for the purpose of launching the aircraft from a flat surface.

FIG. 5B illustrates the aircraft during launch. As can be seen, clip pin 518 is removed from the releasable clip 512 which has disengaged from retaining pin 504. As a result, the aircraft is free to move forward. Once the aircraft has moved forward, the tension on bungee cord 502 is released and bungee cord 502 disengages from launch pin 510 when ring 514 slides off of launch pin 510. Once free of launch pin 510, the bungee cord 502 can be retracted by the tensioning device or manually retracted by the pilot. As the aircraft gains speed and altitude, the wings 106, 108 can be swept back to reduce drag and increase speed.

Figure 6:
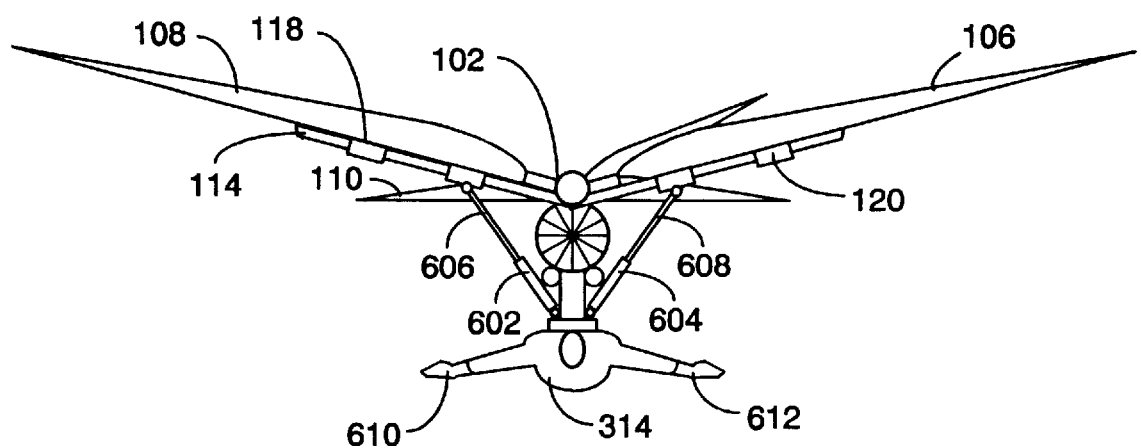
FIG. 6 is an alternative embodiment showing independently rotatable dual axis wings. The wings are moved by powered actuators which are controlled by telepresence (telemetrically controlled) gloves.

FIG. 6 illustrates an alternative embodiment in which wings 106, 108 are independently controlled by powered wing actuator assemblies that are comprised of arms 606, 608 and actuators 602, 604. In the preferred embodiment, each wing is independently controlled by its respective wing actuator assembly 602, 604, 606, 608. The wing actuator assemblies 602, 604, 606, 608 can be controlled by manually operated controls or by telepresence gloves 610, 612. Telepresence gloves 610, 612 are well known in the art and have sensors in the glove to sense their position and movement in relation to an external object, in this case the aircraft. When the pilot moves a hand vertically or horizontally, the change in location is translated into control signals which move the respective wing 106, 108 correspondingly. The wing actuator assembly 602, 604, 606, 608 controls lateral (vertical) wing motion and a powered slider controls longitudinal (horizontal) wing motion. Also shown in this figure is an optional jet propulsion engine 614. Jet propulsion engines small enough for mounting on a hang glider or on an ultralite aircraft are commercially available and well known in the art. For example, the JFFS100-13 starter jet motor from Garrett AiResearch Corporation provides 90 HP.

Figure 7A:
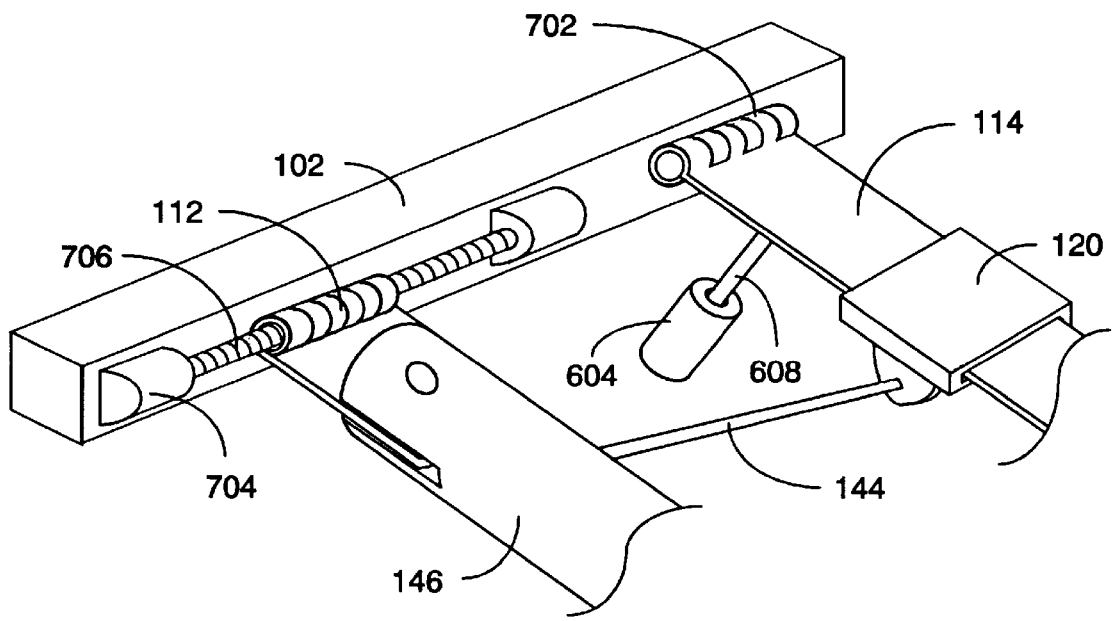
FIG. 7A is a perspective view of the embodiment of FIG. 6 showing a hinge attachment of the dual axis wings to the slider and to the hinged support bar. The wings are independently moved by powered actuator assemblies.
Figure 7B:
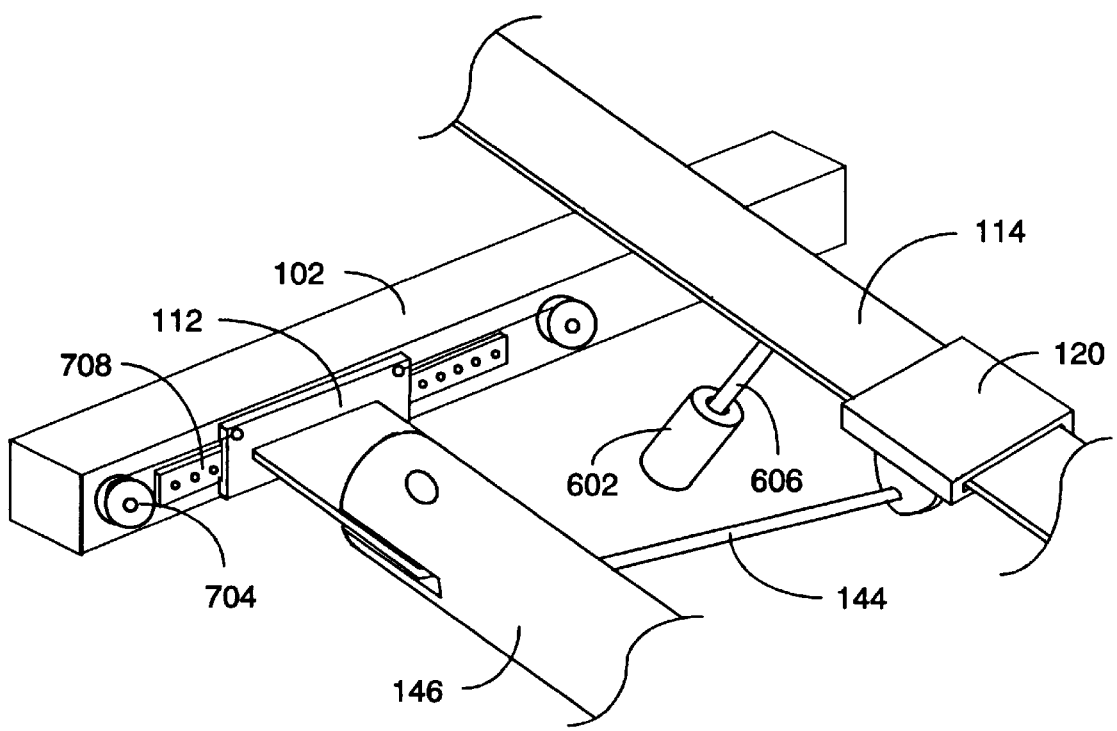
FIG. 7B is a perspective view of the embodiment of FIG. 8 showing a hinge attachment of the dual axis wings to the slider and to a support bar which is rigidly attached to both wings. The wings are not independently moved in this embodiment and are controlled by a single powered actuator assembly.

FIG. 7A illustrates the slider 112 used with the wing actuator assemblies 602, 604, 606, 608 discussed above in regard to FIG. 6. In this embodiment, the support bar 114 is attached via a hinge 702 to keel 102 (or fuselage 1004 if used in a conventional heavy aircraft). A threaded rod 706 moves the wing 106 longitudinally under control of power unit 704. The leading edge spar 146 is rotationally attached to slider 112. The wing 106 is moved laterally by wing actuator assembly 604, 608. In this embodiment, each wing 106, 108 is capable of independent movement. In FIG. 7B, the leading edge spar 146 rotates longitudinally on slider 112 along slider track 708. The support bar 114 is fixed to the keel 102 (or fuselage 1004 if used in a conventional heavy aircraft). Rotational movement of support bar 114 is controlled by wing actuator assembly 602, 606. Boom 144 functions the same in FIGS. 7A and 7B. For ease of illustration, it is shown as a fixed connection to boom sleeve 120, but in practice would be hingedly attached.

Figure 8:
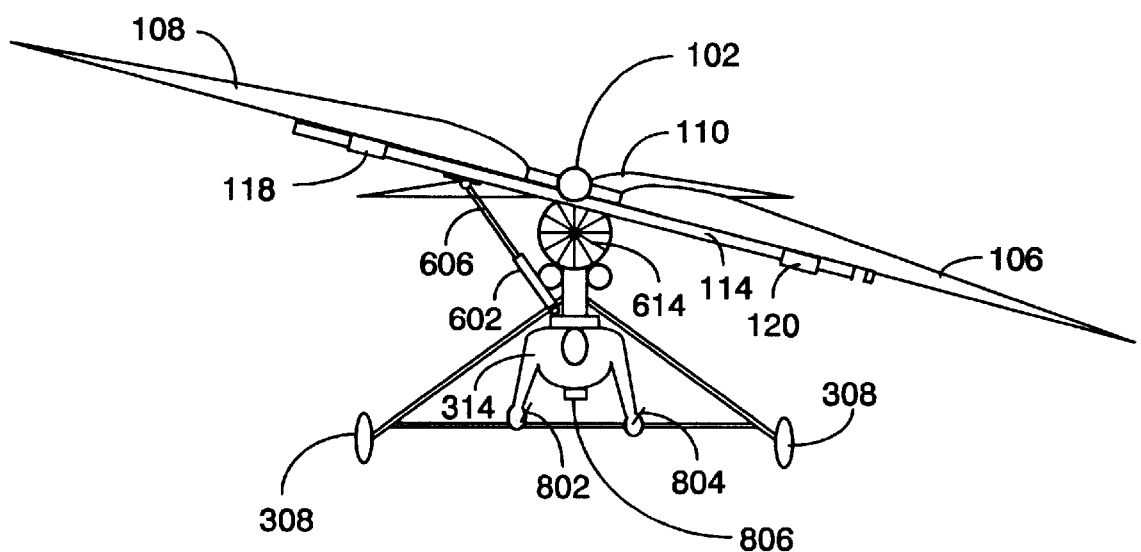
FIG. 8 is a proximal end view of an alternative embodiment showing a jet propulsion drive mounted above the pilot.

FIG. 8 shows an alternative embodiment in which the slider 112 moves longitudinally along keel 102 as it did in FIGS. 1–2. Also, the wings 106, 108 in this embodiment do not move independently. As a result a single actuator assembly 602, 606 can control both wings 106, 108. Joysticks 802, 804 are electrically connected to control unit 806 and control the lateral and longitudinal movement of wings 106, 108 via control of wing actuator assembly 602, 606 and slider 112 respectively. Jet engine 614 is shown mounted above the pilot. Alternatively, a single joystick can be used to control both longitudinal and lateral motion of the wings 106, 108.

Figure 9:
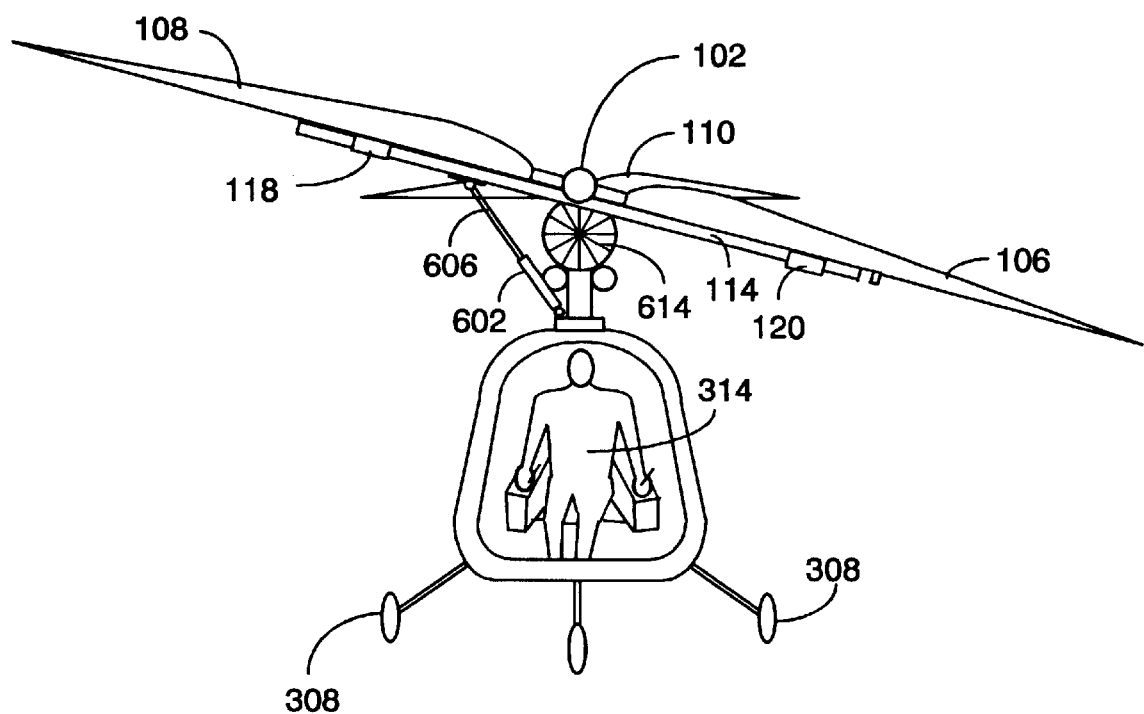
FIG. 9 is a proximal end view of an alternative embodiment showing an ultralite with dual axis wings and a powered actuator for moving the dual axis wings.

FIG. 9 shows an alternative embodiment in which the dual axis wings are mounted on an ultralite aircraft. The slider 112 moves longitudinally along keel 102 as it did in the FIG. 8. Also, the wings 106, 108 in this embodiment do not move independently. As a result a single actuator assembly 602, 606 can control both wings 106, 108.

Figure 10A:
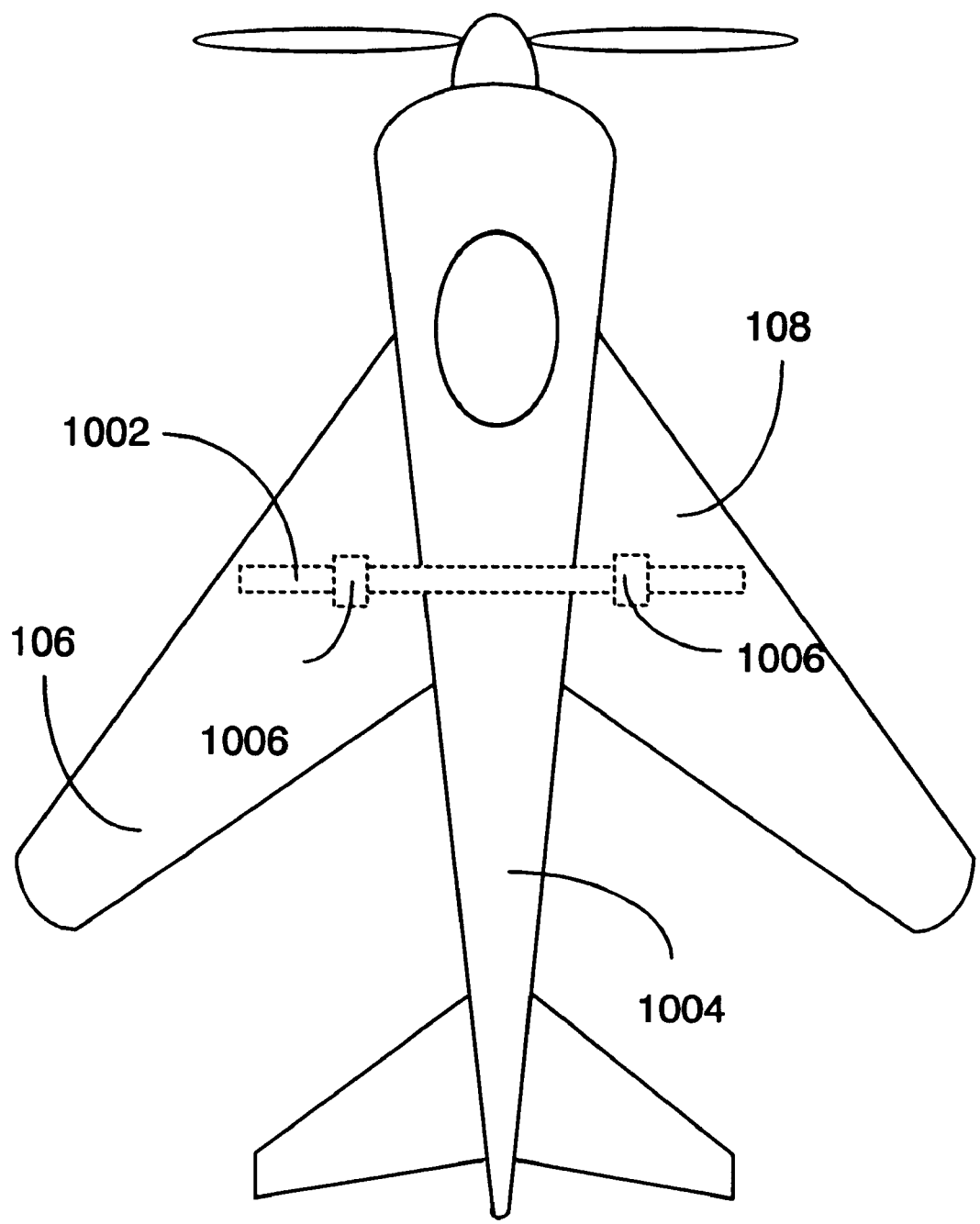
FIG. 10A is a top view showing a preferred embodiment of a conventional heavy movable wing aircraft with the wings in the swept configuration.

FIG. 10A is a top view showing a preferred embodiment of a conventional heavy aircraft with movable wings. In this figure, the wings are in the swept position.

Figure 10B:
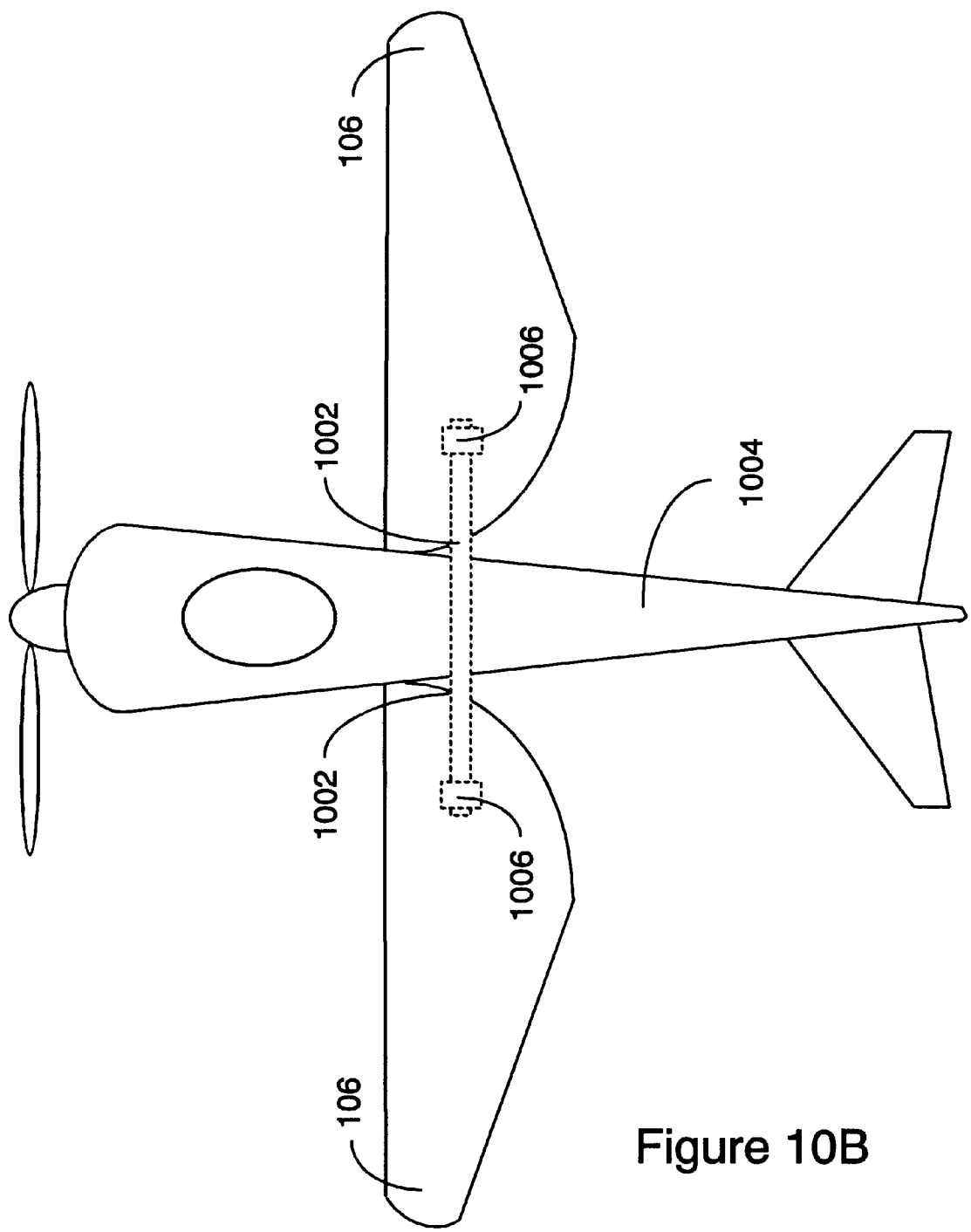
FIG. 10B is a top view showing a preferred embodiment of a conventional heavy movable wing aircraft with the wings in the flared configuration.

FIG. 10B is a top view showing the embodiment of FIG. 10A the wings in the flared configuration.

FIG. 10C is a top view showing the embodiment of FIG. 10A with one wing in the swept configuration and the other wing in a flared configuration. This independent wing movement is achieved by moving wing along spar 1002. As slider 112, which is mounted inside fuselage 1004 is moved longitudinally, the wing 106 slides backward on slider 112. At the same time, wing 106 is slidably secured to spar 1002 by sleeve 1006. Spar 1002 is rigidly attached to fuselage 1004 which in turn causes wing 106 to rotate to a flared position as it is moving aft with slider 112, thus moving in two directions simultaneously. An advantage of this structure is that separate sliders 112 can be used for each wing 106, 108. The independent control of each wing provides the pilot with additional control and maneuvering capability not previously available with movable wing aircraft such as the F-111 fighter.

Figure 11A:
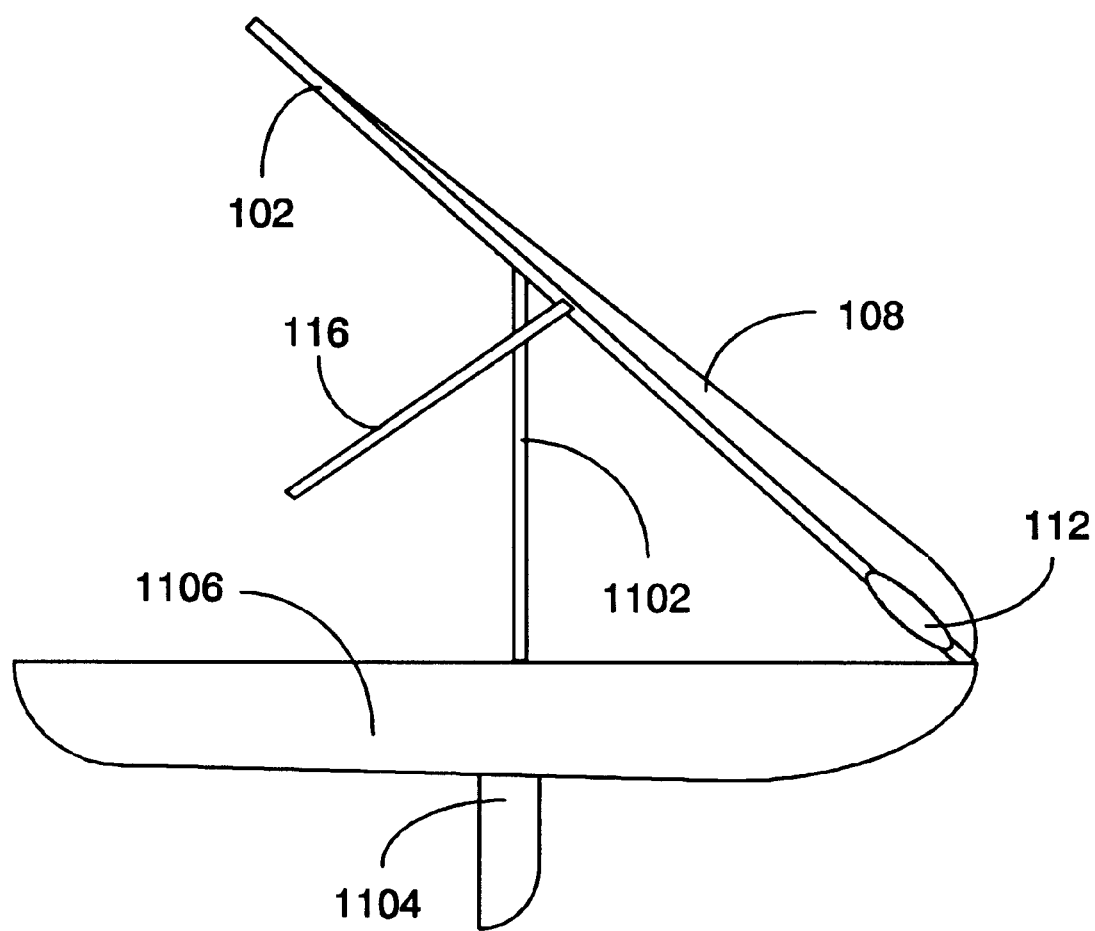
FIG. 11A is a side view showing a preferred embodiment of a dual axis wing mounted on a sailboat. A dashed line image of the wing is shown titled forward to illustrate the longitudinal tilting capability of the wing.

FIG. 11A is a side view showing a preferred embodiment of a dual axis wing mounted on a sailboat. Keel 102 supports slider 112 and wings 106, 108 in the same manner as the other embodiments. However, in the sailboat embodiment of the dual axis wing, the keel 102 is attached to a movable mast 1102 and to the bow of the sailboat. Movable mast 1102 is attached to a submerged blade 1104 which provides stability by dampening the movement of the mast 1102. This embodiment illustrates a catamaran structure which uses hulls 1106, the those skilled in the art will recognize that the dual axis wings 106, 108 can be implemented on a variety of boat types. This figure illustrates the slider 112 in the forward (dive) position.

Figure 11B:
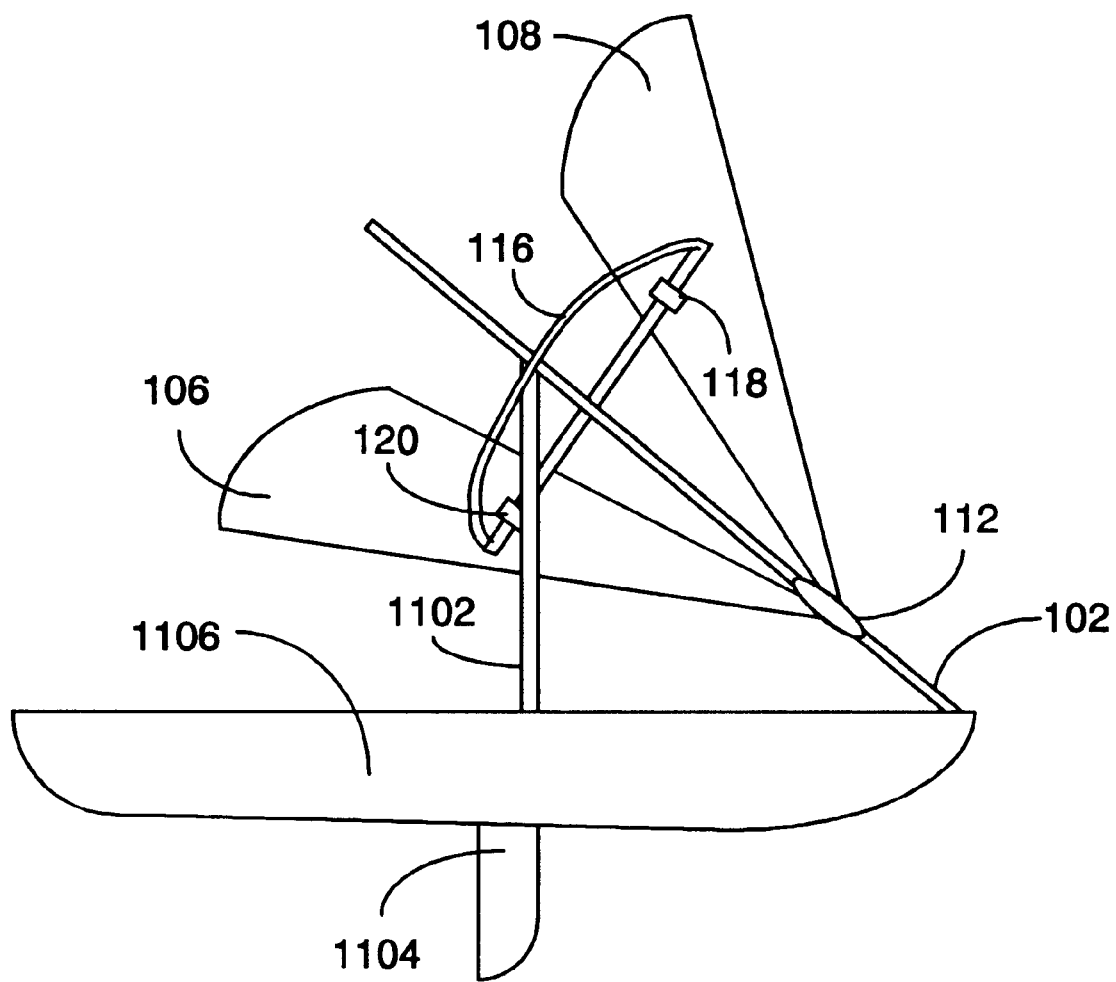
FIG. 11B is a side view showing a preferred embodiment of a dual axis wing mounted on a sailboat. The wing is shown titled to the side to illustrate the lateral tilting capability of the wing.

FIG. 11B is a side view showing a the embodiment of FIG. 1A with the keel 102, wing 108 and slider 112 rotated laterally. In addition, the slider 112 is moved back from the bow to position the wings 106, 108 in the flared position. This provides the pilot a wide range of control of the wing position. Of course, the wings can be slid from the flared to the dive position in the same manner as the other embodiments discussed above.

An important advantage of this embodiment is that it allows the sailboat to not only respond to wind conditions, but also to control the lift from the wings 106, 108 to more effectively respond to changes sea conditions such as waves or currents. Its quick response also allows the pilot to use wing lift in combination with waves to perform acrobatic maneuvers such as raising the sailboat out of the water, etc.

While the invention has been described with respect to a preferred embodiment thereof, it will be understood by those skilled in the art that various changes in detail may be made therein without departing from the spirit, scope, and teaching of the invention. For example, the material used to construct the aircraft may be anything suitable for the particular aircraft type, the size and shape of the wings may vary, the number of dual axis wings may vary (for example, a biplane structure may be employed). The arrangement of components may vary. For example, the tail assembly may be moved to the proximal end of the aircraft and the propulsion unit may be moved to the distal end of the aircraft. Likewise, the size and type of propulsion unit may vary based on the aircraft's type and intended purpose, etc. Accordingly, the invention herein disclosed is to be limited only as specified in the following claims.

I claim:

1. An aircraft, further comprising:

a keel;

a tail assembly attached to the keel;

a slider slidably attached to the keel such that the slider can move longitudinally in relation to the keel;

at least a first and second dual axis wings, the dual axis wings pivotably attached to the slider such that the wings may pivot on the slider in a substantially longitudinal direction;

control means attached to the dual axis wings such that the dual axis wings can be pivoted from a substantially flared position to a substantially swept position as the slider is moved longitudinally under control of the control means;

the control means further comprising a control bar attached at a first end to a first dual axis wing and attached at a second end to a second dual axis wing, the control bar is split into a first control arm attached to the first dual axis wing and a second control arm attached to the second dual axis wing; and means to pivot the control bar at a pivot point such that movement of the control bar about the pivot point causes the dual axis wings to pivot on the slider and causes the slider to move longitudinally whereby the dual axis wings pivot as they move longitudinally;

whereby the control arms can independently pivot the first and second dual axis wings on the slider.

2. An aircraft, further comprising:

a keel;

a tail assembly attached to the keel;

a slider slidably attached to the keel such that the slider can move longitudinally in relation to the keel;

at least a first and second dual axis wings, the dual axis wings pivotably attached to the slider such that the wings may pivot on the slider in a substantially longitudinal direction;

control means attached to the dual axis wings such that the dual axis wings can be pivoted from a substantially flared position to a substantially swept position as the slider is moved longitudinally under control of the control means; and the slider is split into a first slider segment attached to the first dual axis wing and a second slider segment attached to the second dual axis wing, each slider segment capable of independent longitudinal motion in relation to the keel, and each dual axis wing capable of independent pivoting on its respective slider segment;

whereby the dual axis wings pivot as they move longitudinally and can be independently moved from a flared to a swept position.

3. An aircraft, as in claim 2, wherein the control means further comprises a powered wing actuator, the powered wing actuator having means to pivot the dual axis wings and longitudinally move the slider.

4. An aircraft, further comprising:

a fuselage;

a tail assembly attached to the fuselage;

a slider slidably attached to the fuselage such that the slider can move longitudinally in relation to the fuselage;

at least a first and second dual axis wings, the dual axis wings pivotably attached to the slider such that the wings may pivot on the slider in a substantially longitudinal direction, and further attached to the slider such that they may pivot laterally in relation to the keel; and control means attached to the dual axis wings such that the dual axis wings can be pivoted from a substantially flared position to a substantially swept position as the slider is moved longitudinally under control of the control means;

whereby the dual axis wings pivot longitudinally and laterally in relation to the keel.

5. An aircraft, further comprising:

a keel;

a tail assembly attached to the keel;

a slider slidably attached to the keel such that the slider can move longitudinally in relation to the keel and the slider is attached to the keel such that it can rotate laterally in relation to the keel;

at least a first and second dual axis wings, the dual axis wings pivotably attached to the slider such that the wings may pivot on the slider in a substantially longitudinal direction; and control means attached to the dual axis wings such that the dual axis wings can be pivoted from a substantially flared position to a substantially swept position as the slider is moved longitudinally under control of the control means;

whereby the dual axis wings can slide longitudinally, pivot as they move longitudinally, and rotate laterally.

6. An aircraft, as in claim 5, wherein the slider is split into a first slider segment attached to the first dual axis wing and a second slider segment attached to the second dual axis wing, each slider segment capable of at least partial independent lateral rotation in relation to the keel under control of the control means;

whereby the dual axis wings can be independently rotated on the slider segments.

7. An aircraft, as in claim 6, wherein the control means further comprises a powered wing actuator, the powered wing actuator having means to rotate the dual axis wings.

8. An aircraft, as in claim 5, wherein the slider is split into a first slider segment attached to the first dual axis wing and a second slider segment attached to the second dual axis wing, each slider segment capable of independent longitudinal motion in relation to the keel, and each dual axis wing capable of independent pivoting on its respective slider segment;

whereby the dual axis wings can be independently moved from a flared to a swept position.

9. An aircraft, as in claim 8, wherein each slider segment is capable of at least partial independent lateral rotation in relation to the keel under control of the control means;

whereby the dual axis wings can be independently rotated on the slider segments.

10. An aircraft, as in claim 9, wherein the control means further comprises a powered wing actuator, the powered wing actuator having means to rotate the dual axis wings.

11. An aircraft, as in claim 5, wherein the tail assembly is rotatably attached to the keel, the rotation of the tail assembly further being independent of the dual axis wings.

12. An aircraft, as in claim 5, wherein the dual axis wings are attached to the slider with hinges such that the dual axis wings are capable of independent rotation in relation to the keel;

whereby the dual axis wings can slide longitudinally and pivot longitudinally while rotating laterally via the hinges.

13. An aircraft, further comprising:

a keel;

a tail assembly attached to the keel;

a slider slidably attached to the keel such that the slider can move longitudinally in relation to the keel;

at least a first and second dual axis wings, the dual axis wings pivotably attached to the slider such that the wings may pivot on the slider in a substantially longitudinal direction, and further attached to the slider such that they may pivot laterally in relation to the keel; and control means attached to the dual axis wings such that the dual axis wings can be pivoted from a substantially flared position to a substantially swept position as the slider is moved longitudinally under control of the control means;

whereby the dual axis wings pivot longitudinally and laterally in relation to the keel.

14. An aircraft, as in claim 13, wherein the control means further comprises:

a control bar attached at a first end to a first dual axis wing and attached at a second end to a second dual axis wing; and means to pivot the control bar at a pivot point such that movement of the control bar about the pivot point causes the dual axis wings to pivot on the slider and causes the slider to move longitudinally.

15. An aircraft, as in claim 13, wherein the control means further comprise at least one powered wing actuator attached to each of the dual axis wings such that when the powered wing actuator is activated, its respective dual axis wing will pivot on the slider and the slider will move longitudinally.

16. An aircraft, as in claim 13, wherein the tail assembly is rotatably attached to the keel, the rotation of the tail assembly further being independent of the dual axis wings.

17. An aircraft, as in claim 13, further comprising:

a bungee launch assist cord, the bungee launch assist cord attached to the aircraft at one end and having means to attach to a first fixed object at the other end;

release means to releasably secure the aircraft to a second fixed object;

tensioning means to apply tension to the bungee launch assist cord after it is attached to the first fixed object, the bungee launch assist cord and the release means secure the aircraft attached to the aircraft such that tension applied to the bungee launch assist cord is balanced by the release means;

means to release the release means after tension is applied to the bungee launch assist cord such that the tension from the bungee launch assist cord accelerates the aircraft;

means to release the bungee launch assist cord;

whereby the bungee launch assist cord creates forward motion and assists in the launch of the aircraft from a substantially flat surface.

18. An aircraft, as in claim 17, further comprising a bungee retractor attached to the aircraft and the bungee launch assist cord, the bungee retractor having means to retract the bungee launch assist cord after it is released.

19. An aircraft, as in claim 13, further comprising a propulsion unit attached to the aircraft, the propulsion unit having means to provide at least a portion of the forward thrust required to maintain flight.

20. An aircraft, as in claim 19, wherein the propulsion unit is a propeller driven engine.

21. An aircraft, as in claim 19, wherein the propulsion unit is a jet.

22. An aircraft, as in claim 19, wherein the propulsion unit is a ducted fan.

23. An aircraft, further comprising:

a fuselage;

a tail assembly attached to the fuselage;

a slider slidably attached to the fuselage such that the slider can move longitudinally in relation to the fuselage;

at least a first and second dual axis wings, the dual axis wings pivotably attached to the slider such that the wings may pivot on the slider in a substantially longitudinal direction;

control means attached to the dual axis wings such that the dual axis wings can be pivoted from a substantially flared position to a substantially swept position as the slider is moved longitudinally under control of the control means; and the slider is split into a first slider segment attached to the first dual axis wing and a second slider segment attached to the second dual axis wing, each slider segment capable of independent longitudinal motion in relation to the keel, and each dual axis wing capable of independent pivoting on its respective slider segment;

whereby the dual axis wings pivot as they move longitudinally and can be independently moved from a flared to a swept position.

24. An aircraft, as in claim 23, wherein the control means further comprises a powered wing actuator, the powered wing actuator having means to pivot the dual axis wings and longitudinally move the slider.

25. A sailcraft, further comprising:

at least one hull;

a keel attached to the hull;

a slider slidably attached to the keel such that the slider can move longitudinally along at least a portion of the keel, the slider further capable of lateral rotation on the keel;

at least a first and second dual axis wings, the dual axis wings pivotably attached to the slider such that the wings may pivot on the slider in a substantially longitudinal direction;

tilt and rotate means to tilt and rotate the first and second dual axis wings in relation to the hull; and control means attached to the dual axis wings such that the dual axis wings can be moved from a flared position to a swept position by pivoting the dual axis wings on the slider under control of the control means, and further, the control means attached to the dual axis wings such that the dual axis wings can be rotated on the keel;

whereby the dual axis wings are simultaneously pivot on the slider while the slider moves longitudinally, and the dual axis wings tilt and rotate in relation to the hull.

* * * * *